April 30, 1929.  L. LANE  1,711,415
SECURING MEANS FOR CORRUGATED BUILDING SHEETS
Filed Aug. 10, 1927
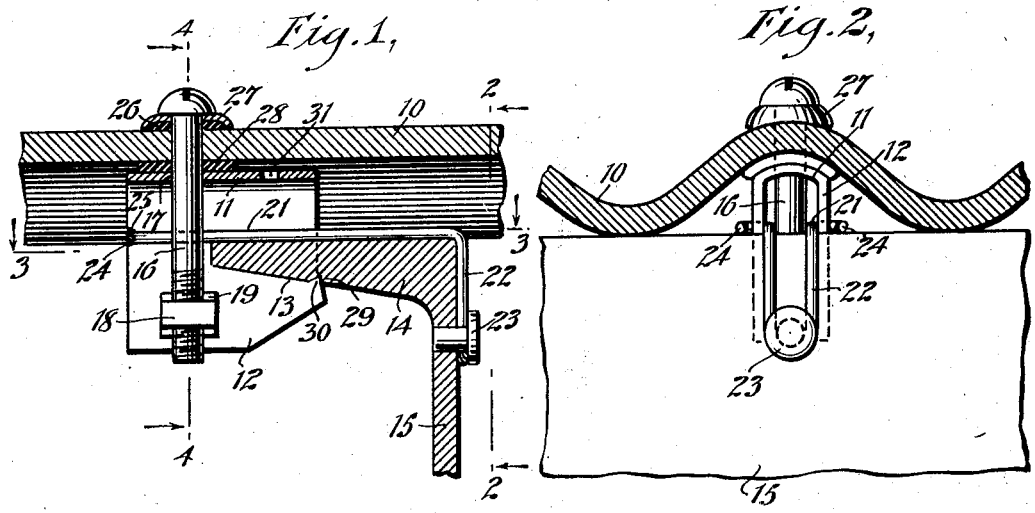
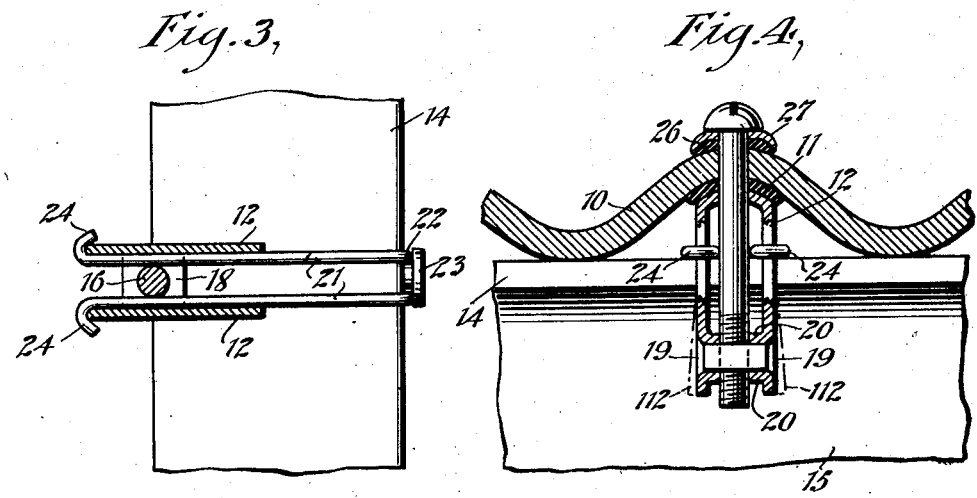
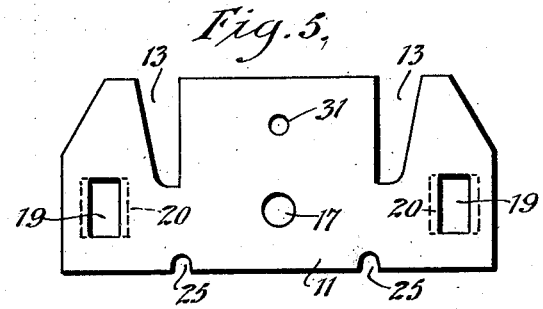
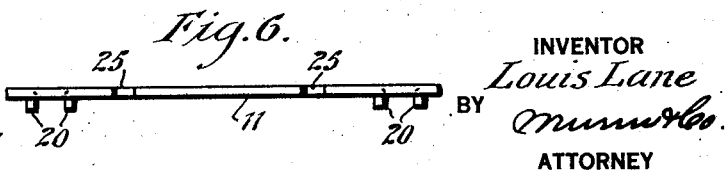
WITNESSES
INVENTOR
Louis Lane
BY
ATTORNEY Patented Apr. 30, 1929.

1,711,415

UNITED STATES PATENT OFFICE.

LOUIS LANE, OF HABANA, CUBA.

SECURING MEANS FOR CORRUGATED BUILDING SHEETS.

Application filed August 10, 1927. Serial No. 211,990.

My invention relates to means for securing sheets to a building, and particularly relates to the securing of corrugated sheet material.

The general object of my invention is to effect a more secure, stronger and more rigid attachment of the sheets as well as to provide a fastening means easy of application, light in weight and of low cost as compared with the forms of fastening means now generally used.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1 is a transverse sectional view of a sheet fastening means embodying my invention, showing the same in use in association with sheet material to be secured by the fastening means and a portion of the purlin to which the fastening means is held.

Figure 2 is a section on the line 2—2 of Figure 1.

Figure 3 is a horizontal section on the line 3—3 of Figure 1.

Figure 4 is a transverse vertical section on the line 4—4 of Figure 1.

Figure 5 is a plan view of the fastening clip before being bent into channel form.

Figure 6 is an edge view of said blank.

In carrying out my invention in practice in accordance with the illustrated example, the sheets 10 are secured as follows. A channel shaped clip 11 or clip generally of U-form, is provided to present sides 12 spaced apart. Said clip 11 is formed from the blank shown in Figures 5 and 6, and is formed at one edge with openings 13 extending from said edge, in which openings is entered the flange 14 of a purlin 15.

A bolt 16 passes through a hole in the sheets 10 and through a hole 17 in the top of the clip 11, and is provided with a nut 18. The sides 12 of the clip 11 are formed with holes 19 and the material of the clip at the holes and resulting from the forming of the latter, is bent laterally inward in the form of flanges 20, between which flanges the nut 18 is held as clearly shown in Figure 4.

A clip 21 formed of wire or length of rod presents two top arms 21 spaced apart and said arms are bent downwardly at right angles to form a depending loop 22 which extends above the shank of a headed stud 23 rigid on the purlin 15. The ends of the arms 21 opposite the central depending loop 22 are returned in the form of hooks 24, shown best in Figure 3, and these hooks 24 are engaged in notches 25 in that edge of the clip 11 opposite the edge in which the openings 13 are formed.

By providing the spaced sides or flanges 12 on the clip 11, a two line seating of the clip on the top 14 of the purlin 15 results, due to the fact that said sides are spread apart, and this affords a more rigid and solid seating and gives greater security of attachment of the clip than is possible with clips having seating and clamping means at one point or along one line only. The lower walls of the openings 13 seat also snugly against the under side of the purlin flange 14, and an additional tightness of clamping can be effected by cold spreading the lower edges of the sides 12, as indicated at 112 in Figure 4. That is to say, the lower portions of the flanges are spread apart beyond the general planes of the sides, and therefore the lower edges of the sides are further apart than the remainder of said sides, the result being that the clip is fixed securely against lateral displacement on the purlin. Further, the channel or U-shape of the clip provides a broad support beneath the corrugated sheets more than do the flat disconnected bands or wires heretofore employed, as the top of the clip is given rigidity by the solid two line or two point seating or clamping of the clips, so that the position of the clip on the purlin or girt 14, 15, is in no way dependent, as is the case with common forms of fastening now in use, upon the tightness of the connection of the attached sheet to the clips, but is independent of such tightness, with the result that no undue strain need be put upon the sheets in order to tightly secure them to the clips for fixed attachment on the purlin or other building member.

In association with the bolt, a lead washer 26 having a cap 27 thereon, is provided beneath the head of the bolt 16, also a seating washer 28 of suitable yielding material is provided on the bolt at the under side of the corrugated sheet 10.

To further increase the tight engagement of the clip 11 with the flange 14 of the purlin, chisel indentations 29 are produced in the under side of said flange 14 and the opposed terminal points 30 of the sides 12 are driven into tight clinching contact with the flange 14 at said indentations 29 (see Figure 1).

An additional hole 31 in transverse alignment with the bolt hole 17 in the clip 11 enables a supplementary clamp to be employed.

With my described assemblage there is less need and less danger of breaking the sheet material 10 or putting on the sheets too great tightening strains, which very frequently causes said sheets to later break or crack under a heavy wind pressure, such danger from too much tightening being thus eliminated by my invention and which danger exists due to the use of clip forms or similar means now in use for attachment of sheets of heavy material of corrugated form to steel frames of supporting members in walls or roofs. The material which the invention is especially adapted to secure is asbestos-cement corrugated sheets, the imperfect fastening of which by the present means is well known.

It is to be noted that the bolt 16 is inserted in the outer side of the sheets downwardly or inwardly, according to whether it is a roof or a wall that is being covered. The head end of the bolt is exposed to the weather. Furthermore, it is to be observed that the nut 18 is in direct engagement with the flanges 20 of the sides 12 of the clip 11, and remote from the cover sheet 10; this serves to hold the screw in fixed position relatively to the bolt hole, even before the sheet 10 is fastened tightly to the clip, thus making the fixing and support of the sheet in its proper position independent of the tightness of the bolt head against the sheet. The fixed engagement of the nut 18 against the clip 11 when the bolt is turned up tightly avoids any concentrated load, such as a stepping on the bolt head, from harming the lead washer 26 or the resilient washer 28, the pressure being all taken up by the nut and clip and through the clip directly to the purlin or other frame member.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

I claim:

1. A fastening means of the class described for securing sheet material, said fastening means including a clip of channel form presenting spaced sides to afford support by its outer end for the sheet, means to secure said clip to a frame member of a building, and means to secure the sheet and clip in position, said last-mentioned means including a bolt adapted to pass through the sheet, said clip having a hole for said bolt, and a nut on the bolt remote from the head of the bolt, the sides of the clip having inwardly extending upper and lower flanges directly engaged by the nut to take the thrusts on the nut after the tightening of the bolt.

2. A fastening means for securing sheets to a building, said fastening means including a channel shaped clip, means on said clip to engage the same with a building member, a clamp having spaced members held to the sides of the clip, said clamp furthermore having a bent looped end adapted to be secured to a building member.

3. In combination with a purlin of a building, a U-shaped clip having spaced sides both bearing against the purlin, the outer end of the clip affording support for a sheet to be secured, a clamp having side arms engaged with the sides of the clip and having a looped end bent at approximately right angles to said side arms, a stud on said purlin engaging said looped end of the clamp, and means to secure sheets to the clip.

4. A fastening means of the class described for securing corrugated non-metallic sheet material to a building, said fastening means including a supporting frame member, a clip to afford support by its outer end for the sheet and having a channel form presenting parallel spaced vertical sides, means to secure said clip to said supporting frame member, and means to secure the sheet and clip in position, said sheet securing means including a bolt adapted to pass through the sheet and located adjacent to the edge of the supporting member, said clip having a hole for said bolt, and a nut on the bolt remote from the head of the bolt, the sides of the clip having inwardly extending upper and lower flanges directly engaged by the nut to take the thrusts on the nut after the tightening of the bolt, said nut-engaging flanges being produced and located in the vertical sides of the clip a distance from the top of the supporting member, the said nut of the sheet-attaching bolt extending into the side walls of the clip, and a non-metallic fibrous material sealing washer about said bolt located between the outer supporting end of the clip and the inner surface of the supported corrugated non-metallic sheet material.

LOUIS LANE.